March 5, 1929.　　　A. H. NERO　　　1,704,626
STRAIN RELIEF FITTING
Filed May 7, 1926
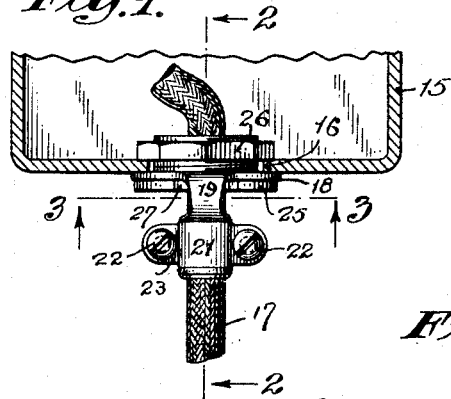
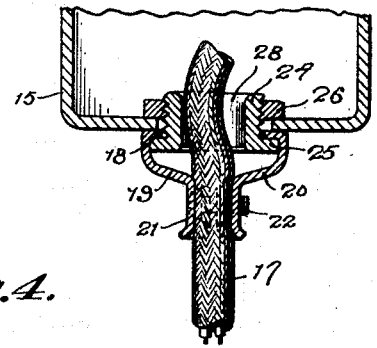
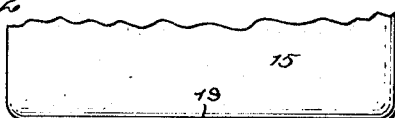
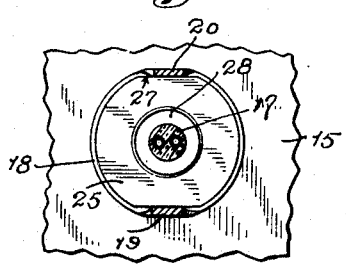
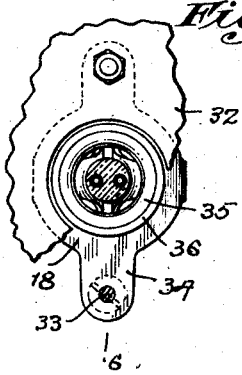
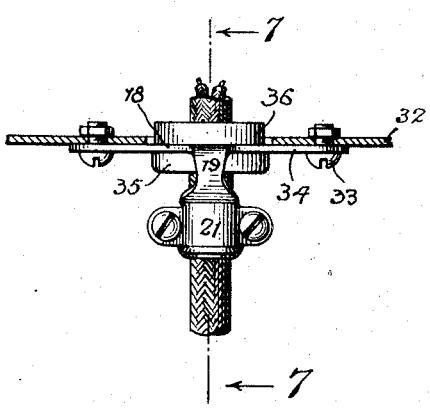
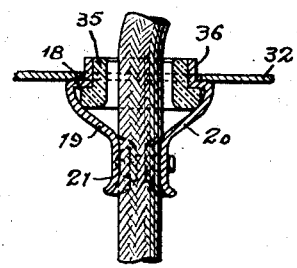
Inventor
ARVID H. NERO
By his Attorneys Patented Mar. 5, 1929.

1,704,626

UNITED STATES PATENT OFFICE.

ARVID H. NERO, OF WEST HARTFORD, CONNECTICUT, ASSIGNOR TO THE ARROW ELECTRIC COMPANY, OF HARTFORD, CONNECTICUT, A CORPORATION OF CONNECTICUT.

STRAIN-RELIEF FITTING.

Application filed May 7, 1926. Serial No. 107,399.

My invention relates to strain relief fittings, and particularly to a fitting adapted to be secured to outlet boxes, wall plates, etc., and serving either to grip the out-going wire cable, or to engage a suspension element such as a chain, where the latter is used in connection with a pendant fixture.

In the accompanying drawings—

Fig. 1 is a section through portion of an outlet box to which is applied a strain relief fitting which embodies my invention in one form;

Fig. 2 is a section on the line 2—2, Fig. 1;

Fig. 3 is a section on the line 3—3, Fig. 1;

Fig. 4 is a broken side elevation illustrating the fitting when used with a suspension chain;

Fig. 5 is a broken plan illustrating a modified form of construction adapted particularly to a wall or face plate installation;

Fig. 6 is a section through a portion of Fig. 5 on the line 6—6 thereof, and

Fig. 7 is a section on the line 7—7, Fig. 6.

In the form illustrated in Figs. 1, 2 and 3, I have shown the fitting installed in an outlet box 15 at one of the usual knock-out apertures 16 thereof. It is well understood that branch connections are made between the wires of the cable 17 and the mains (not shown) within the box 15. These connections are usually soldered and taped, but are sometimes established by means of wire connectors of the binding-screw type, accommodated within the box. Whatever the type of connection between the mains and the wires of the cable 17, it is subject to injury if strains are placed upon the cable and transmitted by the latter to the connections within the box. My invention provides a fitting which protects such connections against strains of this character.

The cable 17 may suspend a lamp socket or other pendant fitting, or it may have at its outer end a connector for carrying current to a motor, or other current translating device. To grip the cable at its point of emergence from the outlet box, and thus to relieve from strain the connections within the box 15, I provide a fitting which comprises a sheet metal base ring 18 adapted to lie against the outer face of the box wall. From the outer margins of the ring, at opposite sides of the latter, and integral therewith, are arms 19 and 20, the free ends of which are shaped to form cable gripping jaws 21 which embrace the cable 17 and clamp the same therebetween by means of draw-up screws 22 passing through lugs 23 integral with the jaws.

To secure the fitting to the box wall, various forms of connection may be employed. Thus for an outlet box I may use a metallic screw bushing, the head 25 of which overlies the ring 18 of the cable grip. A nut 26 screwing on the inner end of the bushing and bearing against the inner face of the outlet box wall, clamps the ring 18 firmly in position. If desired the head 25 of the bushing may be provided with flats 27, against which lie the arms 19 to prevent swiveling of the cable grip with respect to the bushing. The arms 19 and 20 are angled over the head 25 of the bushing, thus loosely assembling the parts to afford a merchandizable unit. The bore 28 of the bushing affords a smooth lining for the knockout hole 16 of the outlet box and prevents danger or injury to the insulating sheath of the cable.

In Fig. 4 I have illustrated an installation in which the pendant fitting (not shown) is suspended on a chain 29. For this type of installation, the present strain relief fitting is provided with a sheet metal yoke 30, having feet 31 pierced in register with the clamping screws 22 of the cable-gripping jaws 21. The fitting in other respects is identical with that illustrated in Figs. 1, 2 and 3, but the strain relief for the connections within the box is now afforded by the suspension of the chain 29 and its load from the fitting through the yoke 30, instead of by its grip on the cable. The fitting is thus adapted to either a cable suspension, such as shown in Figs. 1, 2 and 3, or a chain suspension such as illustrated in Fig. 4, the yoke 30 being discarded when a cable suspension is utilized. The yoke 30, being struck from sheet metal, adds only an insignificant expense to the fitting and is supplied therewith as a part of the appliance in its commercial form.

In Figs. 5, 6 and 7 another method of attaching the strain relief fitting to a support is illustrated, and in this case is adapted to a wall plate or face plate 32. In its main features the fitting is identical with that above described, but its attachment to the plate 32 is effected by a pair of small screw bolts 33 passing through the plate 32 and through lugs 34 integral with the annulus 18 and projecting therefrom at points spaced substantially 90 degrees from the clamping arms 19. An insulating bushing 35 lines the annulus 18 and its inwardly projecting neck 36 which passes through the hole in the plate 32. The bushing is retained by the angled-over arms 19 in the same manner as the metallic screw bushing 24 of Figs. 1, 2 and 3.

I have shown the clamp in forms adapted for application by the wireman or contractor to standard appliances, such as outlet boxes and wall plates. Where the manufacturer desires to include the strain relief fitting as part of the outlet box or plate, the neck 36 illustrated in Figs. 6 and 7 may be spun over the inner face of the plate, thus securing the fitting permanently to its support.

The device lends itself to various types of installation, of which those shown and described are merely illustrative, and to which my invention is not limited. The shape of the parts may be variously modified, as will readily occur to those skilled in the art, without departing from what I claim as my invention.

I claim:—

1. The combination with an apertured cable-outlet member, of a cable grip comprising a sheet metal annulus formed with lugs to secure it against the face of the outlet member and surrounding the aperture therein, a bushing lining said annulus, arms offset from the margins of the annulus and bent to overlie the bushing and retain it in position, and cable-gripping means associated with the free ends of said arms.

2. A strain relief unit comprising a sheet metal annulus, a bushing lining the annulus, outwardly extending lugs to anchor said annulus to a support, arms offset from the annulus and bent over the bushing to retain it within the annulus, and cable-gripping means at the free ends of said arms.

3. A strain relief unit comprising a sheet metal annulus, a bushing lining the annulus, arms offset from the annulus and bent over the bushing to retain it within the annulus, and cable-gripping jaws at the free ends of said arms, together with a U-shaped chain-engaging member detachably connected to said arms by the feet of said U-shaped member.

4. A strain relief unit comprising a sheet metal annulus, a bushing lining the annulus, arms offset from the annulus and bent over the bushing to retain it within the annulus, and cable-gripping jaws at the free ends of said arms, together with draw-up screws associated with said jaws, and a U-shaped chain-engaging yoke detachably engaged by said draw-up screws at its feet.

In testimony whereof I have signed my name to this specification.

ARVID H. NERO.